UNITED STATES PATENT OFFICE.

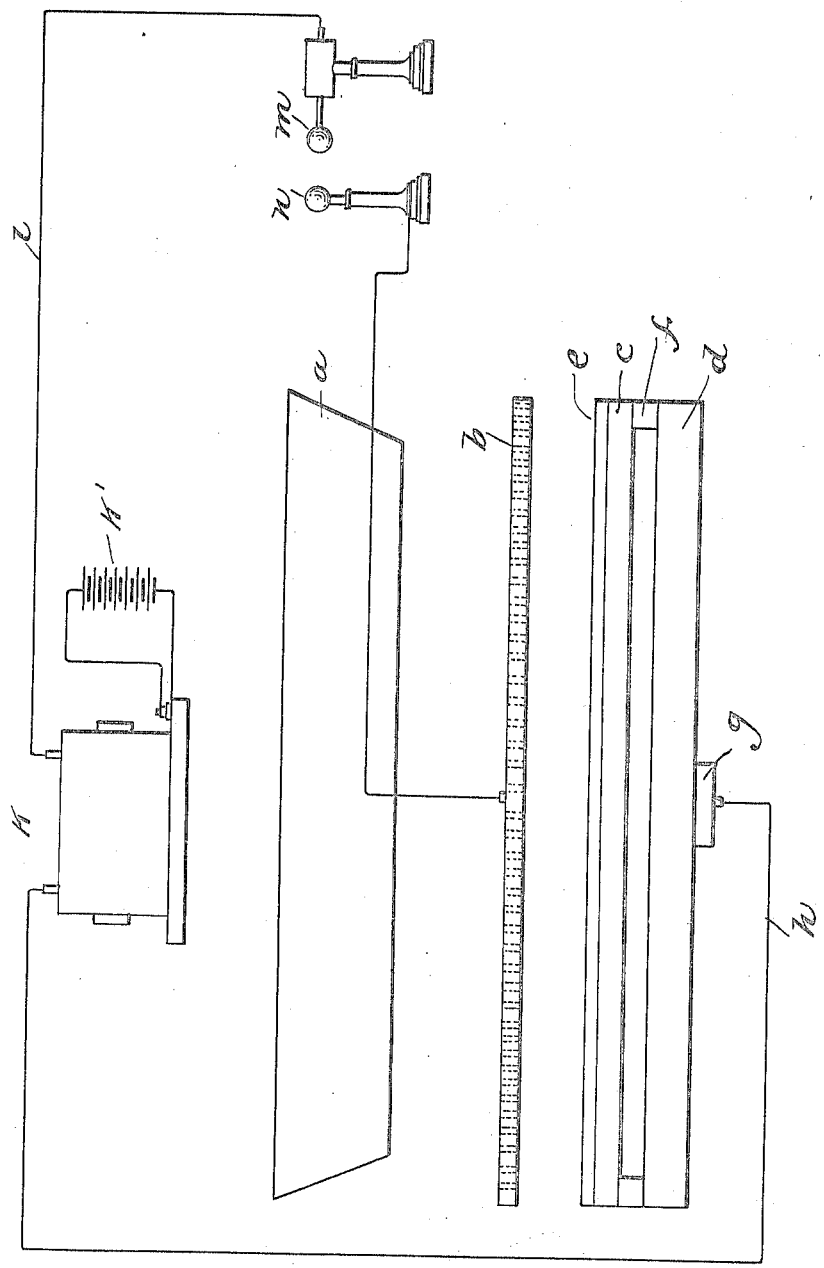

GIULIO CLÉMENT, OF MILAN, ITALY, ASSIGNOR TO CLEMENT GOLD MAGNETO COMPANY, A CORPORATION.

APPARATUS FOR SEPARATING OR CONCENTRATING FINE METALS FROM PULVERIZED MATERIAL.

1,345,835.          Specification of Letters Patent.         Patented July 6, 1920.

Application filed December 16, 1916. Serial No. 137,474.

*To all whom it may concern:*

Be it known that I, GIULIO CLÉMENT, a subject of the King of Italy, residing at Milan, Italy, have invented certain new and useful Improvements in Apparatus for Separating or Concentrating Fine Metals from Pulverized Material, of which the following is a specification.

The present invention has for its object to provide an apparatus for separating or concentrating fine metals from pulverized materials containing these metals. In this apparatus the material to be treated is submitted to the action of an electric charge of high tension between two surfaces, of which one is a metallic surface and the other a surface of non-conductive material. On the latter the particles of the fine metals are concentrated by the effect of the electric charge, while the particles of the mineral are rejected or ejected, effecting a thorough separation.

My invention will be more fully understood by reference to the accompanying drawing, in which the apparatus is diagrammatically illustrated and in which similar reference characters denote corresponding parts.

In the present embodiment of my invention, the apparatus comprises a hopper $a$ into which is thrown the material to be treated and from which the latter is allowed to drop onto a metallic sieve $b$. Below the said sieve a surface of non-conductive material, such as a glass plate $e$, is provided which is carried by two superposed wooden boards $c$, $d$ insulated from one another by glass blocks $f$. Fixed to the board $d$ is a metal block $g$ from which a conductor or wire $h$ leads to a transformer $k$ fed from a battery $k'$ and connected by another conductor $l$ to the metallic sieve $b$, through the medium of a spark gap instrument $m$, $n$. The metallic sieve $b$, the non-metallic plate $e$ and block $g$, act as an electric condenser, so that the separation of the metallic particles from the pulverized material to be treated and dropped on to the sieve $b$, will be concentrated along the electric force lines, passing between the sieve $b$ and the non-conductive plate $e$, that is to say in the center of the latter, the metallic particles tending to form a whole with the metallic block $g$, under the glass plate $e$. The non-metallic particles of the material on the other hand will be thrown toward the edges of the plate $e$ from which they can be readily removed, the repulsion of said non-metallic particles being caused by the electric discharge which takes place between the metallic sieve and the glass plate and which develops a blowing effect.

What I claim and desire to secure by Letters Patent is:

The herein described apparatus comprising a hopper, an electric condenser consisting of a metallic sieve, a non-conductive surface, superposed wooden boards carrying said surface and insulated from one another, a metallic block secured to one of said boards, means for creating an electric current of high tension, an electric conductor connected to said block, another conductor connected to said metallic sieve and a spark gap for regulating the tension of the current.

In testimony whereof I affix my signature in presence of two witnesses.

GIULIO CLÉMENT.

Witnesses:
   DAVID BRONROOK,
   RATIO SALVATORE.